UNITED STATES PATENT OFFICE.

LEONHARD WACKER, OF MUNICH, ASSIGNOR TO THE BADISCHE ANILIN AND SODA FABRIK, OF LUDWIGSHAFEN, GERMANY.

BLUE ACID DYE.

SPECIFICATION forming part of Letters Patent No. 540,564, dated June 4, 1895.

Application filed November 27, 1893. Serial No. 492,043. (Specimens.)

*To all whom it may concern:*

Be it known that I, LEONHARD WACKER, doctor of philosophy, a subject of the King of Bavaria, residing at Munich, in the Kingdom of Bavaria and Empire of Germany, have invented new and useful Improvements in the Manufacture of a New Acid Dye, of which the following is a specification.

My present invention relates to the manufacture of a new coloring matter possessing acid properties. In its chemical nature the said coloring matter is related to the dyes of the indigo series and it resembles indigo carmine in its dyeing properties but yields greener shades of blue.

My new process for the production of said new coloring matter is made up of the following steps or stages: First, by the suitable interaction of amido-phthalic and monochloracetic acids, a new phenyl-glycocol-dicarboxylic acid is obtained, which dyes wool from an acetic acid bath, giving yellow shades; second, by treating this product in the alkaline melt and subsequently oxidizing the resulting product a new carboxylated product results which can itself be used as a dyestuff, and, third, by sulfonating the product of the second step the new acid coloring matter is obtained.

The following examples will serve to illustrate my new process and the manner in which my new acid coloring matter can best be obtained:

*Example of step one, forming the new phenyl-glycocol dicarboxylic acid.*—Dissolve about one hundred and twenty-five (125) parts of the sodium salt of amido-phthalic acid (1:2:3:) (see *Beilstein*, 2d Edition, Vol. 2, page 1,165) in about two hundred (200) parts of water adding about fifty-eight and a half (58½) parts of calcined soda. Next add about one hundred and twenty (120) parts of monochloracetic acid and concentrate the mixture by evaporation on the water-bath.

The desired compound is obtained as sodium salt which is usually at first in the form of sirup but which on further heating eventually solidifies. This new initial material is very readily soluble in water and possesses a yellow brown color. When obtained as above described it dyes wool from an acetic acid bath giving yellow shades.

*Example of step two, forming the new carboxylated product and its leuco-compound.*—Add about one (1) part of the dry sodium salt of phenyl-glycocol-dicarboxylic acid quickly to a melt of about four (4) parts dry caustic potash at a temperature of about two hundred and fifty to two hundred and sixty degrees centigrade, (250° to 260° C.) As soon as the mass has acquired a brown color and the intensity of this color no longer increases, the operation is finished. Pour the melt out and when cold dissolve in about sixty (60) parts of cold water. The solution of the leuco-compound so obtained at once turns green. Acidify with hydrochloric acid. On standing the leuco-compound separates out, but it is preferable to convert it before such separation into the coloring matter. For this purpose add ferric chlorid to the solution until a further addition produces no further precipitate of coloring matter. Collect the dye and purify by redissolving in dilute ammonia and reprecipitating with a mineral acid.

In the above example other alkalies can be used instead of caustic potash in the melt. Moreover to oxidize the leuco-compound other oxidizing agents can be employed such as bichromates in acid solution or air in the alkaline solution. In the latter case a stream of air is passed through the solution till the color thereof no longer increases in intensity and then the dye is precipitated with an acid.

My new carboxylated product of this second step is a blue green powder substantially insoluble in water or in concentrated hydrochloric acid. It dissolves in cold concentrated sulfuric acid giving an intensely green solution from which the carboxylated product is precipitated unchanged by the addition of water. It is substantially insoluble in alcohol, ether and benzol. On heating it sublimes yielding a dark red fume. On treatment with dilute alkalies it assumes the form of alkaline salt which gives a blue solution in water. On adding common salt this soluble form of the carboxylated product is precipitated and can be recrystallized from water being then obtained in the form of fine needles with a coppery luster. On treating with strong alkaline solutions a yellow solution is obtained.

If my new carboxylated product be carefully treated with reducing agents, a leuco-compound is obtained which readily takes up oxygen and is reconverted into the dye itself. On more energetic reduction a more complete decomposition takes place, and the products obtained cannot be readily reconverted into the dye.

*Example of step three, production of the new acid coloring matter.*—Dissolve about one (1) part of the carboxylated product in about ten (10) parts of fuming sulfuric acid containing twelve per cent. (12%) free anhydride. Cool the mixture so that the temperature does not rise above about sixty-five degrees centigrade (65° C.) and maintain at about this temperature for about five (5) hours or until a test portion is completely soluble in hot water. Pour the product into about one hundred (100) parts of water. The dye partly separates out. To complete the precipitation add common salt and filter. Purify by dissolving in sodium acetate and reprecipitating with a mineral acid. Collect and dry.

The sulfo-acid obtained by sulfonating under the conditions above described resembles indigo-carmin in some of its properties but dyes wool from the acid bath giving much greener shades than that dye.

Sulfo-acid yielding still greener shades can be obtained by sulfonating more energetically by using sulfuric acid containing a higher percentage of free anhydride.

My new acid coloring matter is characterized by the following properties: It is a blue green powder soluble in cold water, more readily soluble in hot water giving blue-green solutions. It is similarly soluble in alcohol but substantially insoluble in ether. On adding sodium acetate or a little alkali to the aqueous solution the color turns to a pure blue.

The new acid coloring matter dissolves in strong alkalies giving yellow solutions. The concentrated sulfuric acid solution is green in color. My new dye can be precipitated readily from weak alkaline solutions by addition of common salt in the form of its alkaline salts which on drying constitute a dark powder possessing a coppery luster.

As aforesaid in its chemical constitution my new acid coloring matter is related to the indigo compounds.

Now, what I claim is—

1. The new process for the manufacture of new acid coloring matter which consists in first heating together amido-phthalic acid and monochlor-acetic acid preferably in an alkaline solution, as described in Example 1; next heating the phenyl-glycocol-dicarboxylic acid so obtained in the caustic alkaline melt and treating the resulting leuco-compound with oxidizing agents, and finally sulfonating the resulting carboxylated product by treatment with fuming sulfuric acid, all substantially as hereinbefore described.

2. As a new article of manufacture the new acid coloring matter hereinbefore described which can be derived from amido-phthalic and monochlor-acetic acids and which is soluble in water giving green blue solutions turning blue on addition of sodium acetate, soluble in strong alkaline solutions giving a yellow solution and in concentrated sulfuric acid giving a green solution, all substantially as hereinbefore described.

3. As a new article of manufacture, the carboxylated compound (both in the free state and in combination) which can be derived from amido-phthalic and monochlor-acetic acid and which in the free state is substantially insoluble in water, alcohol, ether, benzene and concentrated hydrochloric acid, but soluble in weak alkalies yielding a blue solution of the alkali salts, and which on careful reduction yields a leuco-compound from which the dye can be regenerated by oxidation, substantially as described.

In testimony whereof I have hereunto set my hand in the presence of two subscribing witnesses.

LEONHARD WACKER.

Witnesses:
EMIL HENZEL,
JACOB HELFRICH.